Figure 1:
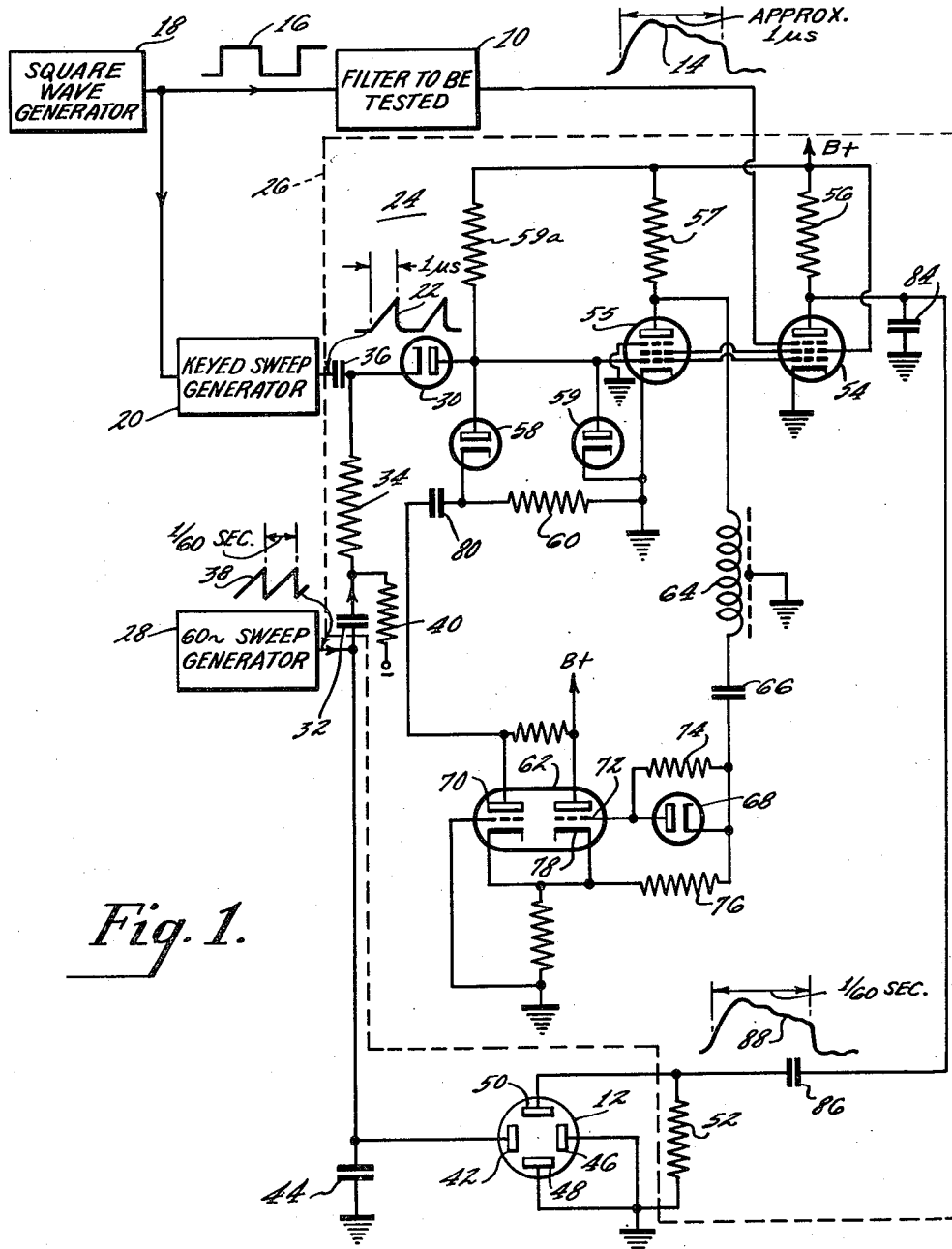

United States Patent Office 2,783,436
Patented Feb. 26, 1957

2,783,436

APPARATUS FOR DISPLAYING HIGH FREQUENCY WAVEFORMS

George W. Gray, Lambertville, and Ray D. Kell, Princeton, N. J., assignors to Radio Corporation of America, a corporation of Delaware Application August 31, 1953, Serial No. 377,504

7 Claims. (Cl. 324—77)

This invention relates generally to apparatus for and methods of displaying waveforms having a high frequency recurrence rate; and more specifically to apparatus for and methods of displaying recurrent high frequency waveforms on an oscilloscope having a relatively narrow band width. While neither specifically nor exclusively limited thereto, the apparatus and methods of the present invention are particularly useful in determining the high frequency response waveforms of electrical components which cannot be displayed on the ordinary, inexpensive oscilloscope that has a relatively poor frequency response.

The ordinary oscilloscope of the type used by the television and radio servicemen, for example, is not capable of measuring with any degree of accuracy, if at all, very high frequency responses of electrical components. These conventional oscilloscopes which are found in practically every electronics laboratory, while useful in determining waveforms of relatively low frequencies, cannot be used to display waveforms recurring at frequencies in the order of megacycles. In order to observe waveforms whose frequency of recurrence is beyond the range of the ordinary, conventional oscilloscopes, oscilloscopes of complex circuitry must be used. These latter oscilloscopes are relatively expensive, costing many thousands of dollars.

With the advent of television and their ultra high frequency channels, the need for wide bandwith oscilloscopes has become more acute. The high cost of these complex instruments, however, has probably been the main factor in preventing their wider distribution.

It is, therefore, a principal object of the present invention to provide improved apparatus for and improved methods of displaying waveforms recurring at a relatively high frequency on a relatively narrow bandwith oscilloscope, to which these waveforms cannot be applied directly.

Another object of the present invention is to provide improved apparatus that may be used with relatively inexpensive, narrow bandwidth oscilloscopes in order to extend the frequency bandwidth range thereof.

A further object of the present invention is to provide improved methods of finding the transient, high frequency response of electrical components such as filters, and the like, without the necessity of resorting to relatively complex and expensive instruments.

It is a further object of the present invention to provide in apparatus of the type described, a unique sampling circuit for deriving an envelope of successive, instantaneous, sample voltages representative of successive points on a recurrent high frequency waveform.

It is a still further object of the present invention to provide improved apparatus, for extending the time base of an oscilloscope, that is economical to manufacture, simple to operate, and highly efficient in use.

These and further objects of the present invention are attained in highly improved apparatus intended for use with the conventional, relatively inexpensive oscilloscope. If, for example, it is desired to obtain the waveform of the transient response of a 10 megacycle filter to a 0.5 megacycle step function, a square wave of 0.5 magacycle is applied to the input of this filter. The transient response at the output of the filter is applied to a sampling circuit. The high frequency square wave is also applied to a keyed sweep generator which, in turn, produces a saw-tooth voltage that varies linearly with time from some reference voltage to a voltage that is positive with respect to the reference voltage. The time required to make this change of voltage is adjusted to be long enough for the filter, or component, under test to have completed its response to the square wave transient. The high frequency saw-tooth wave from the keyed sweep generator is then added to a saw-tooth wave having a relatively low repetition rate, say 60 cycles per second. Thus, the time interval from the square wave transient to the time to which the keyed sweep goes through some particular voltage, with reference to ground, is modulated at the low frequency, the 60 cycle rate. A sample voltage of the transient response waveform of the filter is derived from the sampling circuit in response to the particular voltage of each sawtooth wave in the combined waveform, comprising the saw-tooth voltage output of the keyed sweep generator and the saw-tooth voltage of low repetition rate. Means are provided so that each successive, sample voltage of the transient response of the filter will be successive elements of the transient response curve. These sample voltages, the successive elements of the transient response curve, are detected at the output of the sampling circuit so that their envelope is obtained. This envelope of sample voltages is then applied across one pair of deflection controls of an oscilloscope, and the low frequency saw-tooth wave is applied across a second pair of the deflection controls. Thus, the high frequency response curve of the filter is observed on a conventional oscilloscope whose time base is of a frequency that is relatively much lower than the frequency (0.5 mc.) of the recurrence of the original transient response.

The method of the present invention is to derive a series of substantially instantaneous, successive, sample voltages in a manner such that one sample voltage is derived from each recurrent waveform, respectively. The peak voltages of the successive, sample voltages are then detected in order to obtain the envelope of the recurrent waveform. The envelopes of the detected peaks are then applied to an oscilloscope whose time base is of a length equal to at least the time necessary to derive all of the instantaneous, successive, sample voltages that comprise the response curve to be displayed. It is to be noted that without the improved apparatus and method of the present invention it would be impossible to display a high frequency response curve in the order of megacycles with any degree of accuracy on the conventional, narrow bandwidth oscilloscope.

Figure 2:
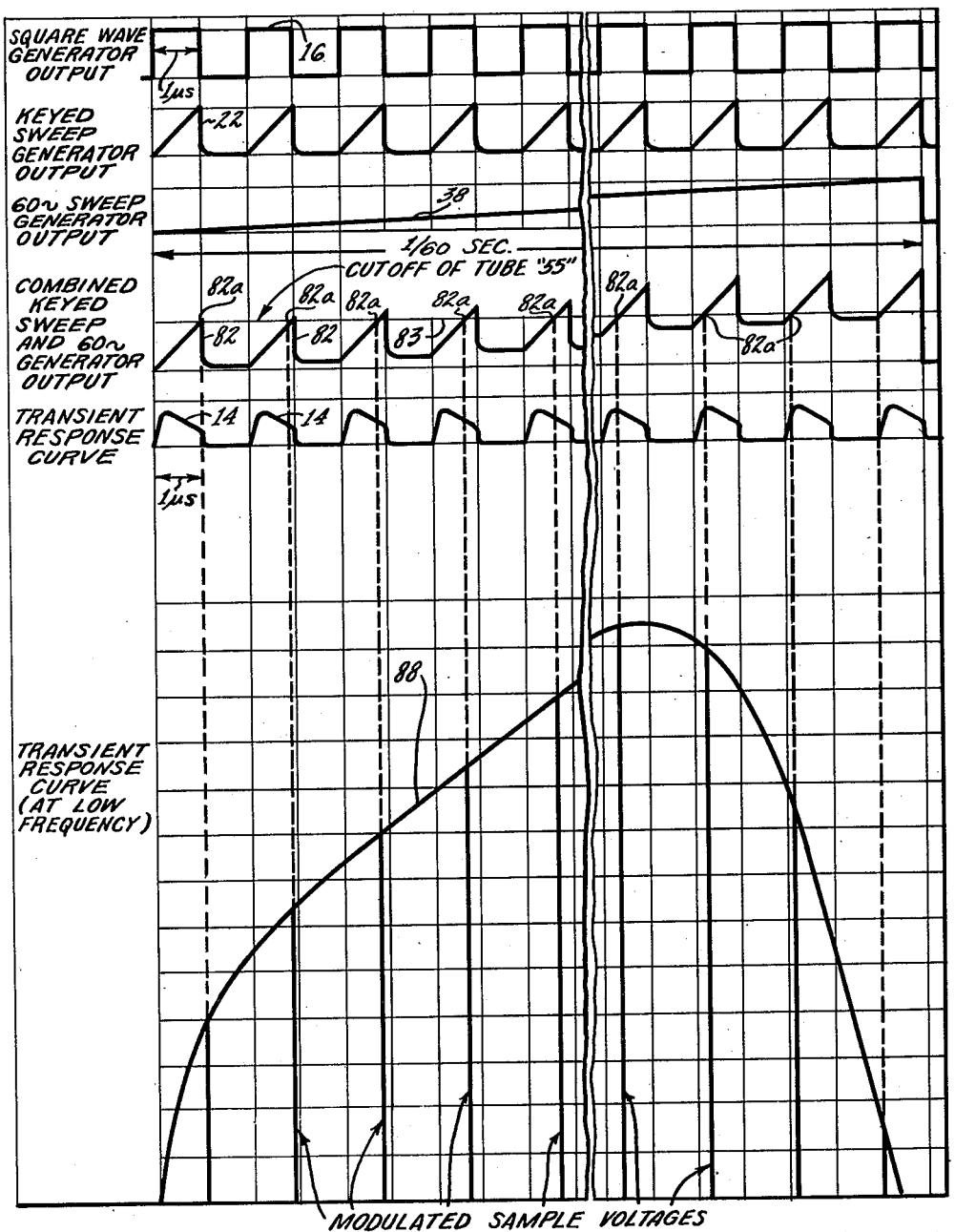

The novel features of the present invention, as well as the invention itself, both as to its organization and method of operation will be understood in detail from the following description when considered in connection with the accompanying drawings, in which similar reference numerals refer to similar elements, and in which:

Fig. 1 is a schematic diagram, partly in block form, of apparatus for displaying high frequency waveforms on a conventional, narrow bandwith oscilloscope swept at a relatively low time base, and Fig. 2 is a series of waveforms used to explain the operation of the apparatus in accordance with the present invention.

Referring, now, particularly to Fig. 1, there is shown apparatus, in accordance with the present invention, for displaying the high frequency response curve of a filter 10 on a conventional oscilloscope 12. While the present invention will be described in connection with the determination of the high frequency transient response curve of the filter, it is to be understood that this is merely by way of illustration; and the present invention may be used to determine recurrent waveforms from any source. Let it be assumed that the filter 10 is a 10 megacycle filter, and that its transient response to a 0.5 megacycle square wave, or step function, is desired. The average, conventional oscilloscope will not be able to measure this response directly at the output of the filter because its frequency bandwidth is too narrow and it is not designed to be swept at a 0.5 megacycle rate.

The frequency response curve 14 to a 0.5 megacycle square wave 16 is obtained by applying a free running square wave generator 18 to the input of the filter 10. The square wave generator 18 is also connected to a keyed sweep generator 20. The keyed sweep generator 20 may be of the conventional, monostable multivibrator type. The keyed sweep generator 20 is adapted to produce at its output a saw-tooth waveform 22 for each positive-going pulse of the square wave generator 18. The keyed sweep generator 20 is connected to a sampling circuit 24, represented within the area enclosed by the dashed line 26 of Fig. 1.

A low frequency sweep generator 28, such as a 60 cycle saw-tooth generator of the conventional type, is also connected to the sampling circuit 24. This latter connection is to the cathode of a diode 30 through a capacitor 32 and a resistor 34. The keyed sweep generator 20 is also connected to the cathode of the diode 30 through a capacitor 36. Thus, the saw-tooth voltages 22, of the keyed sweep generator 20, are added to the saw-tooth voltages 38, of the sweep generator 28, at the cathode of the diode 30 of the sampling circuit 24.

In practice, it has been found that the amplitude of the saw-tooth voltages 38 should be substantially equal to the amplitude of the saw-tooth voltages 22. The cathode of the diode 30 is connected to a source of negative voltage (not shown) through the resistor 34 and a resistor 40 for the purpose hereinafter appearing. The output of the sweep generator 28 is also connected to a horizontal deflection plate 42 of the oscilloscope 12 and to ground through a high frequency filter capacitor 44. The other horizontal deflection plate 46, and a vertical deflection plate 48, of the oscilloscope 12, are connected to ground. The remaining vertical deflection plate 50 is connected to ground through a resistor 52. It is noted that while the oscilloscope 12 is illustrated as having electrostatic plates, or controls; an oscilloscope using magnetic deflection controls may also be used in the manner well known in the art.

The sampling circuit 24 comprises means to produce, at its output, a substantially instantaneous, successive, sample voltage from each recurrent transient response curve. These successive, instantaneous, sample voltages represent successive elements of the transient response curve. The detected envelope of the peaks of the instantaneous sample voltages represent substantially the waveform of the transient response curve.

The sampling circuit 24 comprises electron discharge devices or tubes 54 and 55 of the pentode type. The tubes 54 and 55 are connected in parallel with each other and across a source of operating voltage (not shown) through load resistors 56 and 57, respectively. The transient response curve, or voltage waveform 14 from the output of the filter 10 under test, is applied to the suppressor grid of the tube 54. The cathodes of the tubes 54 and 55 are grounded. The screen grids of the tubes 54 and 55 are connected to each other, and to a source of operating voltage (not shown). The suppressor grid of the tube 55 is grounded. The control grids of the tubes 54 and 55 are connected to each other and to the anode of the diode 30. The control grid of the tube 55 is also connected to the anodes of diodes 58 and 59, respectively, and to a source of voltage (not shown) through a resistor 59a. The cathode of the diode 59 is grounded directly; and the cathode of the diode 58 is grounded through a resistor 60.

The anode of the tube 55 is connected to the grid 72 of a duotriode 62 through a delay line 64, a capacitor 66 and a diode 68. The anode of the diode 68 is connected to the control grid 72 of one of the triodes in the duotriode 62. The duotriode 62 is connected in circuit as a conventional, cathode-coupled amplifier, and serves to provide an amplified output at the anode 70 that is in phase with the input voltage applied to the grid 72. A resistor 74 is connected across the diode 68, and a resistor 76 is connected between the capacitor 66 and the cathode 78 of the duotriode 62. The anode 70 of the duotriode 62 is connected to the cathode of the diode 58 through a capacitor 80.

The operation of the apparatus, in accordance with the present invention, will now be described. Let it be assumed that it is desired to display the transient response curve 14 on the face of the conventional, narrow-bandwidth oscilloscope 12. Referring to Figs. 1 and 2, the square wave 16 is applied to the input of a filter 10, and the transient response curve 14 derived from the output of the filter 10 is applied to the suppressor grid of the tube 54 in the sampling circuit 24. The tube 55 is ordinarily biased beyond cut-off and is, therefore, normally non-conducting. The combined waveform 82, as shown in Fig. 2, which comprises the saw-tooth output 22, from the keyed sweep generator 20, added to the saw-tooth output 38, from the low frequency sweep generator 28, is applied to the cathode of the diode 30. The diode 30 will conduct current therethrough as long as the cathode thereof is at a lower potential than the anode thereof. As soon as the positive-going voltage of each saw-tooth wave 82 goes beyond the cut-off potential of the tube 55, the tube 55 will begin to conduct current. The diode 30 will become non-conductive as the saw-tooth voltage goes above ground. The points at which the tube 55 begins to conduct are shown as 82a in Fig. 2; and the line 83 represents the cut-off voltage of the tube 55.

The purpose of the diode 59 is to keep the control grid of the tube 55 near ground potential since the resistance across the diode 59 is relatively low when it is conducting. Conduction through the tube 55 will produce a negative-going voltage at the anode thereof. This negative-going voltage is delayed momentarily by the delay line 64 and then applied to the grid 72 of the duotriode 62, through the diode 68. This negative-going voltage is amplified by the circuit of the duotriode 62 and an amplified negative-going voltage at the anode 70 thereof is applied to the control grid of the tube 55, through the capacitor 80 and the diode 58. The result of this latter negative-going voltage is to cut off conduction in the tube 55. As a result of a cessation of the flow of current through the tube 55, the anode thereof goes positive. This positive-going voltage is now applied to the cathode of the diode 68 through the delay line 64 and the capacitor 66, whereby conduction ceases in the diode 68. This latter action prevents the tube 55 from oscillating. In other words, as the diode 68 ceases to conduct, the grid 72 of the duotriode 62 returns to zero bias slowly; enough time being allowed for the saw-tooth voltage 22 to go negative.

Thus, it is seen that as each saw-tooth wave 82 in the series of saw-tooth waves, made up of the combined saw-tooth voltages 22 and 38, will trigger the tube 55 "on" as soon as the positive-going voltage of each saw-tooth 82 exceeds the cutoff voltage of the tube 55. It is also understood that the tube 55 will conduct momentarily and then turn itself off after a delay determined by the delay line 64.

Since the tube 54 is connected in parallel with the tube 55, the tube 54 will be turned on and off synchronously with the tube 55. Also, since the transient response voltage waveforms from the filter 10 are applied to the suppressor grid of the tube 54, the output at the anode of the tube 54 will be proportional to the instantaneous signal applied to the suppressor grid at the moment of sampling.

Referring now to Fig. 2, it can be seen that when the positive-going portion of each saw-tooth voltage 82 goes beyond the point 82a, a voltage represented by the cut-off point of the tube 55, current flows through the tube 54 momentarily. This current through the tube 54 is modulated by the instantaneous voltage that is applied to its suppressor grid at the moment of sampling. These modulated, voltage samples are detected by the plate circuit of the tube 54 comprising the resistor 56 and the capacitor 84 connected in series therewith and across the tube 54. The envelope of the detected modulated sample voltages is applied to the vertical deflection control, or plate 50 through a capacitor 86. Thus, it is seen that as the horizontal controls, or plates, 42 and 46 of the oscilloscope are swept by the sweep generator 28, at a relatively low frequency (60 cycles), detected sample voltages from the high frequency recurrent waveforms are applied across the vertical controls or plates of the oscilloscope 12. The result appearing on the face of the oscilloscope 12 will be a waveform 88 of substantially the same shape as the waveform 14 but on a time base within the frequency range of the oscilloscope.

Thus, there has been shown and described in accordance with the object of the present invention, apparatus for and a method of displaying on the face of an oscilloscope a recurrent waveform whose frequency of recurrence is relatively much higher than the normal frequencies of the time base of the oscilloscope. In accordance with the method of the present invention, a series of substantially instantaneous, successive, sample voltages, one sample voltage from each recurrent waveform, is obtained. The peaks of the successive, sample voltages are detected and the envelope of these peaks are applied across one pair of deflection controls of the oscilloscope. The other pair of deflection controls are swept at a relatively much lower frequency than the original recurring waveform.

What is claimed is:

1. Apparatus for determining the transient response curve of a component having an input and an output, said apparatus comprising, in combination, a sampling circuit having first, second and third input means and a pair of output means, means to apply a first series of periodic waves to said input of said component, means to connect said output of said component to said first input means of said sampling circuit to apply a second series of recurrent transient waves thereto, a monostable sweep generator having an input connected to said periodic waves applying means and adapted to be triggered on by each of said periodic waves, said monostable sweep generator having an output connected to said second input means of said sampling circuit to apply a third series periodic waves thereto, a sawtooth generator having an output connected to said third input means of said sampling circuit and adapted to apply a fourth series of sawtooth waves thereto, means connected between said second and third input means in said sampling circuit to combine said third and fourth series of waves into a fifth series of waves, said sampling circuit comprising sample pulse producing means having an input connected to said second input means of said sampling circuit to produce sample pulses in response to a particular portion of each wave in said fifth series of waves, means connecting said first input means to said sample pulse producing means to modulate said sample pulses by said second series of recurrent transient waves, means connected between the output of said sample pulse producing means and said pair of output means of said sampling circuit to detect said modulated sample pulses, an oscilloscope having two pairs of deflection controls, means connecting said sawtooth generator to one pair of deflection controls, and means connecting said pair of output means of said sampling circuit to said other pair of deflection controls.

2. Apparatus for determining the transient response curve of a component having an input and an output, said apparatus comprising, in combination, a sampling circuit having first, second and third input means and a pair of output means, means to apply a first series of periodic waves to said input of said component, means to connect said output of said component to said first input means of said sampling circuit to apply a second series of recurrent transient waves thereto, a monstable sweep generator having an input connected to said periodic waves applying means and adapted to be triggered on by each of said periodic waves, said monostable sweep generator having an output connected to said second input means of said sampling circuit to apply a third series of periodic waves thereto, a sawtooth generator having an output connected to said third input means of said sampling circuit and adapted to apply a fourth series of sawtooth waves thereto, means connected between said second and third input means in said sampling circuit to combine said third and fourth series of waves into a fifth series of waves, said sampling circuit comprising sample pulse producing means having an input connected to said second input means of said sampling circuit to produce sample pulses in response to a particular portion of each wave in said fifth series of waves, means connecting said first input means to said sample pulse producing means to modulate said sample pulses by said second series of recurrent transient waves, means connected between the output of said sample pulse producing means and said pair of output means of said sampling circuit to detect said modulated sample pulses, an oscilloscope having two pairs of deflection controls, means connecting said sawtooth generator to one pair of deflection controls, means connecting said pair of output means of said sampling circuit to said other pair of deflection controls, said sawtooth generator being adapted to generate waves at a relatively much lower frequency than said monostable generator.

3. Apparatus for determining the transient response curve of a component having an input and an output, said apparatus comprising, in combination, a sampling circuit having first, second and third input means and a pair of output means, means to apply a first series of periodic waves to said input of said component, means to connect said output of said component to said first input means of said sampling circuit, a monostable sweep generator having an input connected to said periodic waves applying means and adapted to be triggered on by each of said periodic waves, said monostable sweep generator having an output connected to said second input means of said sampling circuit, a sawtooth generator having an output connected to said third input means of said sampling circuit, means connected between said second and third input means in said sampling circuit to combine outputs of said monostable sweep generator and said sawtooth generator, said sampling circuit comprising sample pulse producing means having an input connected to said second input means of said sampling circuit to produce sample pulses in response to particular portions of said combined outputs, means connecting said first input means to said sample pulse producing means to modulate said sample pulses by said output of said component, means connected between the output of said sample pulse producing means and said pair of output means of said sampling circuit to detect said modulated sample pulses, an oscilloscope having two pairs of deflection controls, means connecting said sawtooth generator to one pair of deflection controls, means connecting said pair of output means of said sampling circuit to said other pair of deflection controls, said sample pulse producing means comprising a pair of multigrid tubes, means connecting said pair of tubes in parallel, said input of said sample pulse producing means comprising one of said multigrids in each of said pairs of tubes, and said means connecting said first input means to said sample pulse producing means comprising a connection from said first input means to another grid of said multigrids in one of said pairs of tubes.

4. In apparatus for determining the transient response of a component, a sampling circuit having first, second and third input means and a pair of output means, means to connect the output of said component to said first input means of said sampling circuit to apply said transient response thereto recurrently, means to connect a monostable sweep generator to said second input means of said sampling circuit, a sawtooth generator having an output connected to said third input means of said sampling circuit, means connected between said second and third input means in said sampling circuit to combine the outputs of said monostable sweep generator and said sawtooth generator, said sampling circuit comprising sample pulse producing means having an input connected to said second input means of said sampling circuit to produce sample pulses in response to particular portions of said combined outputs, means connecting said first input means to said sample pulse producing means to modulate said sample pulses by said recurrent transient response of said component, and means connected between the output of said sample pulse producing means and said pair of output means of said sampling circuit to detect said modulated sample pulses.

5. Apparatus for displaying recurrent waves comprising, in combination, a sampling circuit having first, second and third input means and a pair of output means, means to apply said recurrent waves to said first input means of said sampling circuit, a monostable sweep generator having an input connected to said recurrent waves applying means and adapted to be triggered on by each of said recurrent waves, said monostable sweep generator having an output connected to said second input means of said sampling circuit to apply a first series of periodic waves thereto, a sawtooth generator having an output connected to said third input means of said sampling circuit and adapted to apply a second series of sawtooth waves thereto, means connected between said second and third input means in said sampling circuit to combine said first and second series of waves into a third series of waves, said sampling circuit comprising sample pulse producing means having an input connected to said second input means of said sampling circuit to produce sample pulses in response to a particular portion of each wave in said third series of waves, means connecting said first input means to said sample pulse producing means to modulate said sample pulses by said recurrent waves, means connected between the output of said sample pulse producing means and said pair of output means of said sampling circuit to detect said modulated sample pulses, an oscilloscope having two pairs of deflection controls, means connecting said sawtooth generator to one pair of deflection controls, and means connecting said pair of output means of said sampling circuit to said other pair of deflection controls.

6. Apparatus for displaying recurrent waves comprising, in combination, a sampling circuit having first, second and third input means and a pair of output means, means to apply said recurrent waves to said first input means of said sampling circuit, a monostable sweep generator having an input connected to said recurrent waves applying means and adapted to be triggered on by each of said recurrent waves, said monostable sweep generator having an output connected to said second input means of said sampling circuit to apply a first series of periodic waves thereto, a sawtooth generator having an output connected to said third input means of said sampling circuit and adapted to apply a second series of sawtooth waves thereto, means connected between said second and third input means in said sampling circuit to combine said first and second series of waves into a third series of waves, said sampling circuit comprising sample pulse producing means having an input connected to said second input means of said sampling circuit to produce sample pulses in response to a particular portion of each wave in said third series of waves, means connecting said first input means to said sample pulse producing means to modulate said sample pulses by said recurrent waves, means connected between the output of said sample pulse producing means and said pair of output means of said sampling circuit to detect said modulated sample pulses, an oscilloscope having two pairs of deflection controls, means connecting said sawtooth generator to one pair of deflection controls, means connecting said pair of output means of said sampling circuit to said other pair of deflection controls, said sawtooth generator being adapted to generate waves at a relatively much lower frequency than said monostable generator.

7. In apparatus for displaying recurrent waves, a sampling circuit having first, second and third input means and a pair of output means, means to apply said recurrent waves to said first input means of said sampling circuit, means to connect a monostable sweep generator to said second input means of said sampling circuit, a sawtooth generator having an output connected to said third input means of said sampling circuit, means connected between said second and third input means in said sampling circuit to combine the outputs of said monostable sweep generator and said sawtooth generator, said sampling circuit comprising sample pulse producing means having an input connected to said second input means of said sampling circuit to produce sample pulses in response to particular portions of said combined outputs, means connecting said first input means to said sample pulse producing means to modulate said sample pulses by said recurrent waves, and means connected between the output of said sample pulses producing means and said pair of output means of said sampling circuit to detect said modulated sample pulses.

References Cited in the file of this patent
UNITED STATES PATENTS
2,280,524    Hansen _____ Apr. 21, 1942